(12) United States Patent
Jia

(10) Patent No.: US 12,003,113 B2
(45) Date of Patent: Jun. 4, 2024

(54) WIRELESS CHARGING FOR DEVICES WITH METAL HOUSINGS

(71) Applicant: Google LLC, Mountain View, CA (US)

(72) Inventor: Liang Jia, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 617 days.

(21) Appl. No.: 17/128,326

(22) Filed: Dec. 21, 2020

(65) Prior Publication Data

US 2021/0194282 A1 Jun. 24, 2021

Related U.S. Application Data

(63) Continuation of application No. PCT/US2019/067057, filed on Dec. 18, 2019.

(51) Int. Cl.
| | |
|---|---|
| H02J 7/00 | (2006.01) |
| A44C 5/00 | (2006.01) |
| H01F 38/14 | (2006.01) |
| H02J 50/00 | (2016.01) |
| H02J 50/10 | (2016.01) |

(Continued)

(52) U.S. Cl.
CPC .......... *H02J 50/005* (2020.01); *A44C 5/0053* (2013.01); *H01F 38/14* (2013.01); *H02J 7/0042* (2013.01); *H02J 50/10* (2016.02); *H02J 50/90* (2016.02); *H01F 27/36* (2013.01)

(58) Field of Classification Search
None
See application file for complete search history.

(56) References Cited

U.S. PATENT DOCUMENTS

| | | | |
|---|---|---|---|
| 2011/0074344 A1 | 3/2011 | Park et al. | |
| 2015/0102879 A1* | 4/2015 | Jacobs | H01F 7/0247 |
| | | | 335/294 |
| 2015/0130979 A1 | 5/2015 | Huang et al. | |

(Continued)

FOREIGN PATENT DOCUMENTS

EP 3189576 B1 10/2018

OTHER PUBLICATIONS

International Preliminary Report on Patentability in International Appln. No. PCT/US2019/067057, dated Jun. 30, 2022, 11 pages.

(Continued)

*Primary Examiner* — Arun C Williams
(74) *Attorney, Agent, or Firm* — Fish & Richardson P.C.

(57) ABSTRACT

Devices for wireless charging with metal housings. The device comprises a wireless power receiving coil and an associated coil core, wherein the coil core defines a recess and at least a portion of the wireless power receiving coil is disposed in the recess; and a housing comprising one or more metal portions, wherein the housing is configured to receive at least a portion of the wireless power receiving coil and the associated coil core in an opening defined by the one or more metal portions. Alternatively, the device comprises a wireless power receiving coil and an associated coil core; a housing comprising one or more metal portions; and an alignment feature configured to interact with a magnet of a wireless charger to align the device with the wireless charger, wherein the alignment feature comprises a plurality of metal elements that are electrically insulated from each other.

25 Claims, 8 Drawing Sheets

(51) Int. Cl.
*H02J 50/90* (2016.01)
*H01F 27/36* (2006.01)

(56) References Cited

U.S. PATENT DOCUMENTS

| | | | |
|---|---|---|---|
| 2016/0072302 | A1 | 3/2016 | Von Novak, III et al. |
| 2017/0098951 | A1 | 4/2017 | Olgun et al. |
| 2017/0126064 | A1 | 5/2017 | Lee |
| 2017/0158066 | A1 | 6/2017 | Tokura et al. |
| 2017/0266452 | A1 | 9/2017 | Kimura |
| 2019/0082083 | A1 | 3/2019 | Jarvis et al. |
| 2020/0076220 | A1* | 3/2020 | Chow .................. H02J 50/90 |

OTHER PUBLICATIONS

IN Office Action in Indian Appln. No. 202247038350, dated Oct. 18, 2022, 6 pages (with English Translation).

Jeong et al., "Wireless charging of a metal-body device," IEEE Transactions on Microwave Theory and Techniques, Mar. 2017, 65(4):1077-86.

PCT International Search Report and Written Opinion in International Appln. No. PCT/US2019/067057, dated Aug. 14, 2020, 19 pages.

EP Office Action in European Application No. 19839053.6, dated Sep. 27, 2021, 9 pages.

Digikey.com [online], "Advanced Wireless Power Parts Make Designing Chargers Easier Than Ever" Apr. 16, 20215, retrieved on Mar. 21, 2024, retrieved from URL <https://www.digikey.com/en/articles/advanced-wireless-power-parts-make-designing-chargers-easier-than-ever>, 6 pages.

EDN.com [online], "Pot cores are not perfect" Jul. 2016, retrieved on Mar. 21, 2024, retrieved from URL <https://www.edn.com/pot-cores-are-not-perfect/>, 6 pages.

He et al., "Permanent Magnet or Additional Electromagnet Compensation Structures of End Electromagnet Module for Mid-Low Speed Maglev Train." World Electric Vehicle Journal 13.5: 72, Apr. 2022, 12 pages.

Office Action in European Appln. No. 19839053.6, mailed on Dec. 22, 2023, 6 pages.

Wikipedia.org [online], "Magnetic Core" created on Feb. 2005, retrieved on Mar. 21, 2024, retrieved from URL <https://en.wikipedia.org/wiki/Magnetic_core>, 11 pages.

\* cited by examiner

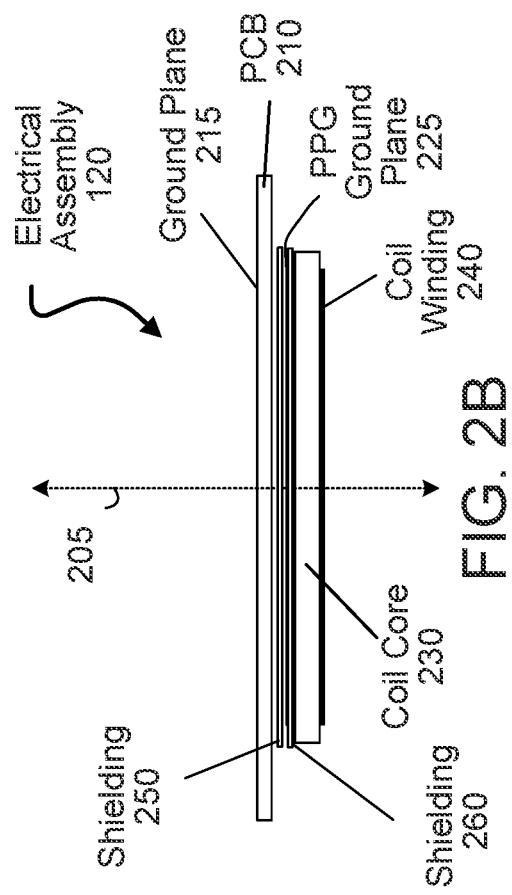
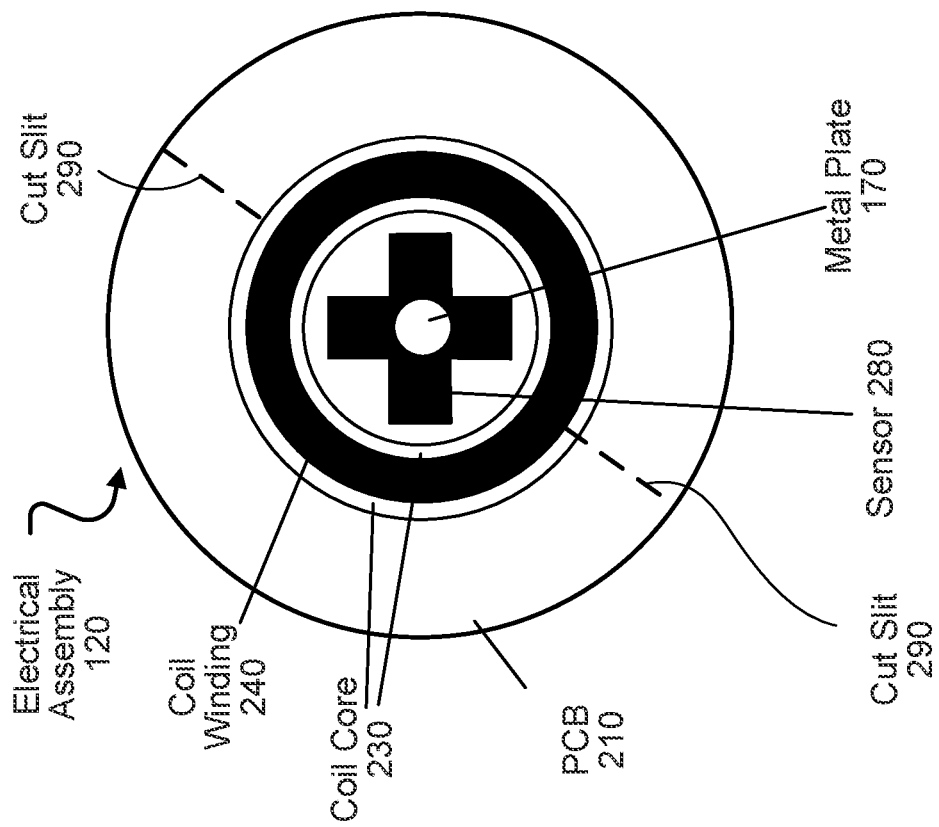
FIG. 2B
FIG. 2A

| STEEL DISK THICKNESS (Normalized) | STEEL DISK DIAMETER (Normalized) | | | | | | | | | | | | |
|---|---|---|---|---|---|---|---|---|---|---|---|---|---|
| | 1 | 1.05 | 1.10 | 1.15 | 1.20 | 1.30 | 1.40 | 1.50 | 1.60 | 1.80 | 2.00 | | |
| 0.096 | 16% | 34% | 36% | 37% | 37% | 36% | 35% | 34% | 33% | 32% | 31% | | |
| 0.144 | 22% | 48% | 52% | 53% | 53% | 52% | 51% | 50% | 49% | 48% | 47% | | |
| 0.200 | 26% | 55% | 65% | 69% | 70% | 70% | 69% | 68% | 67% | 65% | 64% | | |
| 0.280 | 30% | 58% | 71% | 78% | 82% | 87% | 89% | 89% | 89% | 88% | 87% | | |
| 0.368 | 33% | 60% | 72% | 80% | 85% | 91% | 94% | 96% | 97% | 98% | 98% | | |
| 0.480 | 36% | 62% | 73% | 81% | 85% | 92% | 95% | 97% | 98% | 99% | 100% | | |
| 0.600 | 39% | 63% | 75% | 81% | 86% | 92% | 95% | 97% | 98% | 99% | 100% | | |
| 0.840 | 43% | 66% | 76% | 83% | 87% | 93% | 95% | 97% | 98% | 99% | 100% | | |
| 1.080 | 45% | 68% | 78% | 84% | 88% | 93% | 96% | 97% | 98% | 99% | 100% | | |
| 1.312 | 48% | 69% | 78% | 84% | 88% | 93% | 95% | 97% | 99% | 99% | 100% | | |
| 1.552 | 50% | 70% | 79% | 85% | 89% | 94% | 96% | 98% | 99% | 100% | 100% | | |

WIRELESS CHARGING FOR DEVICES WITH METAL HOUSINGS

CROSS-REFERENCE TO RELATED APPLICATION

This application is a continuation of and claims the benefit of International Application No. PCT/US2019/067057, filed Dec. 18, 2019. The disclosure of the foregoing application is hereby incorporated by reference in its entirety.

TECHNICAL FIELD

The present specification relates to wireless charging for devices with metal housings.

BACKGROUND

Some modern electrical devices permit wireless charging for easier connectivity. In some cases, these devices may include a permanent magnet to align the devices with respect to a wireless charger.

Some devices have an exterior housing that includes metal. A metal exterior can provide appearance and durability. However, metal in the exterior of a device often interferes with wireless charging.

SUMMARY

In some implementations, a device includes a power receiving coil and a housing that has a metal exterior. The device can include features that enable efficient wireless charging despite the presence of the metal of the housing being within the region or footprint of a transmitting coil of a wireless charger.

A few examples of feature that help enable high power transfer efficiency are discussed briefly, and will be discussed further below. First, the metal housing can be formed of or broken into multiple electrically insulated segments to reduce eddy current formation. As shown in FIG. 1, the metal housing includes slits that separate pieces of the metal housing. Second, circuit boards or other metal elements within the electrical device can have cuts or slits to reduce the size of metal regions. Third, the electrical device can include a coil core for the power receiving coil that extends along the power receiving coil toward the exterior of the electrical device. This can enable the coil core to extend further toward the surface that is placed on the wireless charger, thus decreasing the effective distance between the coil core and the charger. Fourth, the electrical device can use a metal plate rather than a permanent magnet as an alignment feature to align with a wireless charger. In some implementations, the metal plate can be a laminated plate, such as one having electrically insulated metal strips, which can reduced eddy currents and power transfer loss in the metal plate. Fifth, the electrical device can include one or more layers of shielding to further reduce inefficiency in power transfer. Sixth, the dimensions and structure of the electrical device can be arranged to place the power receiving coil and an associated coil core close to the exterior surface of the electrical device 100, thus allowing the power receiving coil and coil core to be near the power transfer coil of the charger. An electrical device can be made to enable efficient wireless charging by including any or all of these features, including any subcombination of the features.

As explained below, there are various aspects of the design that can improve charging efficiency and effectiveness. These include, for example, (1) a coil core defining a recess with at least a portion of the wireless power receiving coil disposed in the recess, (2) an alignment feature that includes a plurality of metal elements, and (3) a housing comprising a plurality metal portions (e.g., having slits cut to separate pieces of the housing). Each of these techniques, and others described below, can be used individually or in any appropriate combination. In other words, embodiments of the technology can include one or more of the techniques, in any combination or sub-combination.

One innovative aspect of the subject matter described in this specification can be embodied in a device comprising a wireless power receiving coil and an associated coil core, wherein the coil core defines a recess and at least a portion of the wireless power receiving coil is disposed in the recess; and a housing comprising one or more metal portions, wherein the housing is configured to receive at least a portion of the wireless power receiving coil and the associated coil core in an opening defined by the one or more metal portions.

In some implementations, the coil core has a substantially U-shaped cross-section.

In some implementations, the coil core has the U-shaped cross-section along at least a curved portion of the coil core. The recess is a curved channel defined along the curved portion. The power receiving coil is at least partially disposed in the curved channel.

In some implementations, the coil core is at least partially formed of ferrite.

In some implementations, the metal of the housing extends around a majority of the wireless power receiving coil and the associated coil core.

In some implementations, the metal of the housing extends around a majority of an outer perimeter of the wireless power receiving coil and the associated coil core.

In some implementations, the metal of the housing extends around substantially an entire outer perimeter of the wireless power receiving coil and the associated coil core.

In some implementations, the wireless power receiving coil has a substantially circular inner side and a substantially circular outer side, and the coil core extends (i) along a top side of the wireless power receiving coil and (ii) along the inner side of the wireless power receiving coil and/or the outer side of the wireless power receiving coil.

In some implementations, the wireless power receiving coil has top side and a bottom side opposite the top side, wherein the bottom side is configured to face toward a wireless charger when the device is in position to be receive power from the wireless charger. The wireless power receiving coil has a height from the top side to the bottom side, and wherein the coil core extends along a majority of the height of the wireless power receiving coil.

In some implementations, the coil core has an inner wall extending along an inner perimeter of the wireless power receiving coil. The coil core has an outer wall extending along an outer perimeter of the wireless power receiving coil. The wireless power receiving coil is at least partially disposed between the inner wall and the outer wall.

In some implementations, the device is a mobile device.
In some implementations, the device is a wearable device.
In some implementations, the device is a watch.
In some implementations, the device includes an alignment feature configured to interact with a magnet of a wireless charger to align the device with the wireless charger.

In some implementations, the alignment feature comprises a plurality of metal elements that are electrically insulated from each other.

In some implementations, the alignment feature is located at a center of the wireless power receiving coil.

In some implementations, the alignment feature is formed of steel strips that are electrically insulated from each other.

In some implementations, the alignment feature is a disc formed of laminated steel.

In some implementations, the housing includes a plurality of metal portions, wherein the housing is configured to receive at least a portion of the wireless power receiving coil and the associated coil core in an opening defined by the plurality of metal portions.

In some implementations, the plurality of metal portions are electrically insulated from each other.

In some implementations, the plurality of metal portions are placed at an exterior of the device and extend around substantially an outer perimeter of the device except for gaps between the metal portions, each of the gaps being 3 mm or less.

In some implementations each of the gaps are 1 mm or less.

In some implementations, the device is a watch that includes a first watch band segment coupled to the housing and a second watch band segment coupled to the housing. The housing has a first metal portion extending from the first watch band segment to the second watch band segment. The housing has a second metal portion extending from the first watch band segment to the second watch band segment.

In some implementations, the wireless power receiving coil and the associated coil core are part of an electronic assembly that is removable from the housing.

In some implementations, the device includes a circuit board having a ground plane, wherein the ground plane is divided into a plurality of separate sections.

In some implementations, the housing has a substantially circular outer perimeter and defines at least two slits that extend radially between metal portions of the housing. The device comprises a circuit board having a ground plane, wherein the circuit board has a substantially circular outer perimeter and defines at least two slits that extend radially and separate the ground plane into separate segments.

Another innovative aspect of the subject matter described in this specification can be embodied in a device comprising a wireless power receiving coil and an associated coil core; a housing comprising one or more metal portions, wherein the housing is configured to receive at least a portion of the wireless power receiving coil and the associated coil core in an opening defined by the one or more metal portions; and an alignment feature configured to interact with a magnet of a wireless charger to align the device with the wireless charger, wherein the alignment feature comprises a plurality of metal elements that are electrically insulated from each other.

In some implementations, the alignment feature is located at a center of the wireless power receiving coil.

In some implementations, the alignment feature is formed of steel strips that are electrically insulated from each other.

In some implementations, the alignment feature is a disc formed of laminated steel.

In some implementations, the device is a mobile device.

In some implementations, the device is a wearable device.

In some implementations, the device is a watch.

In some implementations, the coil core defines a recess and at least a portion of the wireless power receiving coil is disposed in the recess.

In some implementations, the coil core has a substantially U-shaped cross-section.

In some implementations, the coil core has the U-shaped cross-section along at least a curved portion of the coil core. The recess is a curved channel defined along the curved portion. The power receiving coil is at least partially disposed in the curved channel.

In some implementations, the coil core is at least partially formed of ferrite.

In some implementations, the metal of the housing extends around a majority of the wireless power receiving coil and the associated coil core.

In some implementations, the metal of the housing extends around a majority of an outer perimeter of the wireless power receiving coil and the associated coil core.

In some implementations, the metal of the housing extends around substantially an entire outer perimeter of the wireless power receiving coil and the associated coil core.

In some implementations, the wireless power receiving coil has a substantially circular inner side and a substantially circular outer side, and the coil core extends (i) along a top side of the wireless power receiving coil and (ii) along the inner side of the wireless power receiving coil and/or the outer side of the wireless power receiving coil.

In some implementations, the wireless power receiving coil has top side and a bottom side opposite the top side, wherein the bottom side is configured to face toward a wireless charger when the device is in position to be receive power from the wireless charger. The wireless power receiving coil has a height from the top side to the bottom side, and wherein the coil core extends along a majority of the height of the wireless power receiving coil.

In some implementations, the coil core has an inner wall extending along an inner perimeter of the wireless power receiving coil. The coil core has an outer wall extending along an outer perimeter of the wireless power receiving coil. The wireless power receiving coil is at least partially disposed between the inner wall and the outer wall.

In some implementations, the housing includes a plurality of metal portions, wherein the housing is configured to receive at least a portion of the wireless power receiving coil and the associated coil core in an opening defined by the plurality of metal portions.

In some implementations, the plurality of metal portions are electrically insulated from each other.

In some implementations, the plurality of metal portions are placed at an exterior of the device and extend around substantially an outer perimeter of the device except for gaps between the metal portions, each of the gaps being 3 mm or less.

In some implementations each of the gaps are 1 mm or less.

In some implementations, the device is a watch that includes a first watch band segment coupled to the housing and a second watch band segment coupled to the housing. The housing has a first metal portion extending from the first watch band segment to the second watch band segment. The housing has a second metal portion extending from the first watch band segment to the second watch band segment.

In some implementations, the wireless power receiving coil and the associated coil core are part of an electronic assembly that is removable from the housing.

In some implementations, the device includes a circuit board having a ground plane, wherein the ground plane is divided into a plurality of separate sections.

In some implementations, the housing has a substantially circular outer perimeter and defines at least two slits that extend radially between metal portions of the housing. The device comprises a circuit board having a ground plane, wherein the circuit board has a substantially circular outer perimeter and defines at least two slits that extend radially and separate the ground plane into separate segments.

Another innovative aspect of the subject matter described in this specification can be embodied in a device comprising a wireless power receiving coil and an associated coil core; and a housing comprising a plurality metal portions, wherein the housing is configured to receive at least a portion of the wireless power receiving coil and the associated coil core in an opening defined by the plurality of metal portions.

In some implementations, the plurality of metal portions are electrically insulated from each other.

In some implementations, the plurality of metal portions are placed at an exterior of the device and extend around substantially an outer perimeter of the device except for gaps between the metal portions, each of the gaps being 3 mm or less.

In some implementations each of the gaps are 1 mm or less.

In some implementations, the device is a watch that includes a first watch band segment coupled to the housing and a second watch band segment coupled to the housing. The housing has a first metal portion extending from the first watch band segment to the second watch band segment. The housing has a second metal portion extending from the first watch band segment to the second watch band segment.

In some implementations, the wireless power receiving coil and the associated coil core are part of an electronic assembly that is removable from the housing.

In some implementations, the device includes a circuit board having a ground plane, wherein the ground plane is divided into a plurality of separate sections.

In some implementations, the housing has a substantially circular outer perimeter and defines at least two slits that extend radially between metal portions of the housing. The device comprises a circuit board having a ground plane, wherein the circuit board has a substantially circular outer perimeter and defines at least two slits that extend radially and separate the ground plane into separate segments.

In some implementations, the device is a mobile device.

In some implementations, the device is a wearable device.

In some implementations, the device is a watch.

In some implementations, the device includes an alignment feature configured to interact with a magnet of a wireless charger to align the device with the wireless charger.

In some implementations, the alignment feature comprises a plurality of metal elements that are electrically insulated from each other.

In some implementations, the alignment feature is located at a center of the wireless power receiving coil.

In some implementations, the alignment feature is formed of steel strips that are electrically insulated from each other.

In some implementations, the alignment feature is a disc formed of laminated steel.

In some implementations, the coil core defines a recess and at least a portion of the wireless power receiving coil is disposed in the recess.

In some implementations, the coil core has a substantially U-shaped cross-section.

In some implementations, the coil core has the U-shaped cross-section along at least a curved portion of the coil core. The recess is a curved channel defined along the curved portion. The power receiving coil is at least partially disposed in the curved channel.

In some implementations, the coil core is at least partially formed of ferrite.

In some implementations, the metal of the housing extends around a majority of the wireless power receiving coil and the associated coil core.

In some implementations, the metal of the housing extends around a majority of an outer perimeter of the wireless power receiving coil and the associated coil core.

In some implementations, the metal of the housing extends around substantially an entire outer perimeter of the wireless power receiving coil and the associated coil core.

In some implementations, the wireless power receiving coil has a substantially circular inner side and a substantially circular outer side, and the coil core extends (i) along a top side of the wireless power receiving coil and (ii) along the inner side of the wireless power receiving coil and/or the outer side of the wireless power receiving coil.

In some implementations, the wireless power receiving coil has top side and a bottom side opposite the top side, wherein the bottom side is configured to face toward a wireless charger when the device is in position to be receive power from the wireless charger. The wireless power receiving coil has a height from the top side to the bottom side, and wherein the coil core extends along a majority of the height of the wireless power receiving coil.

In some implementations, the coil core has an inner wall extending along an inner perimeter of the wireless power receiving coil. The coil core has an outer wall extending along an outer perimeter of the wireless power receiving coil. The wireless power receiving coil is at least partially disposed between the inner wall and the outer wall.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2A is a backside view of an electrical assembly of the electrical device.

FIG. 2B is a side view of the electrical assembly of the electrical device.

Like reference numbers and designations in the various drawings indicate like elements.

DETAILED DESCRIPTION

Figure 1:
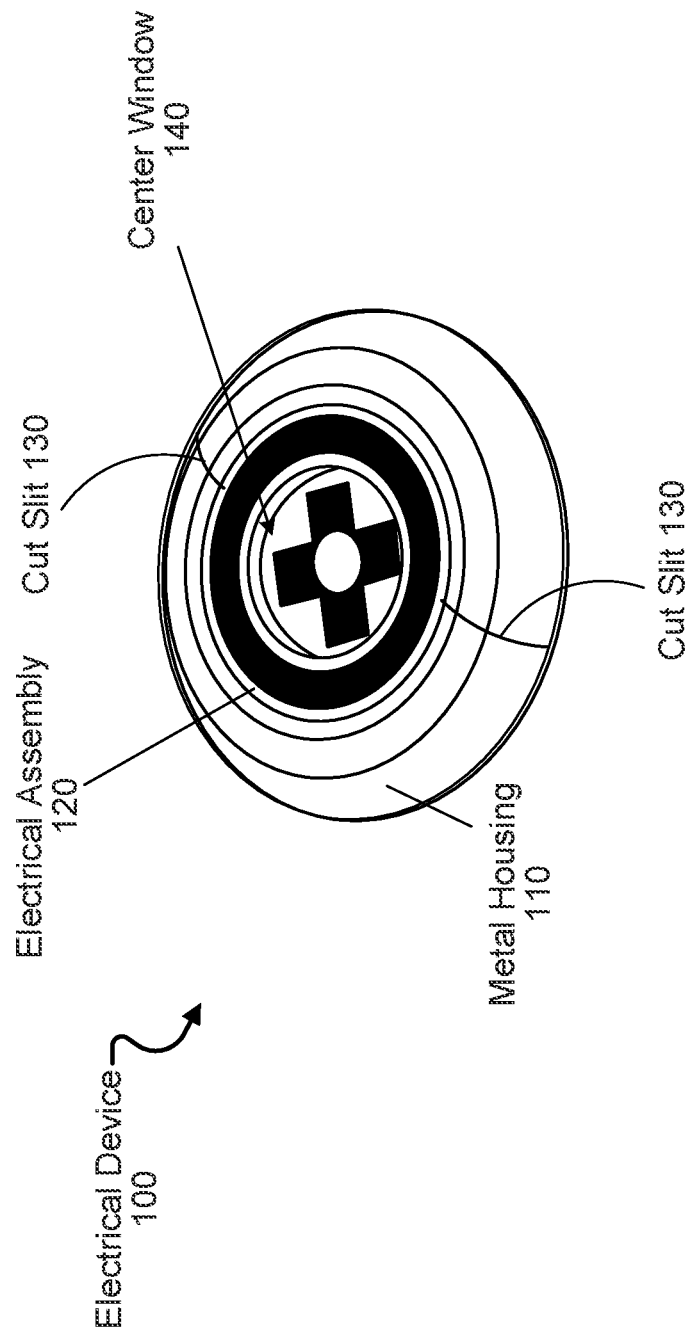
FIG. 1 is a perspective view of a backside of an electrical device.

FIG. 1 is a perspective view of a back side of an electrical device 100. In some implementations, the electrical device 100 includes a power receiving coil to receive power transferred wirelessly from a power source, such as a wireless charger. The device 100 can also have a housing 110 that includes metal. To facilitate wireless charging, the electrical device 100 can include various features and enhancements that improve the efficiency of wireless charging in the presence of the metal housing 110.

A few examples of feature that help enable high power transfer efficiency are discussed briefly, and will be discussed further below. First, the metal housing 110 can be formed of or broken into multiple electrically insulated segments to reduce eddy current formation. As shown in FIG. 1, the metal housing 110 includes slits 130 that separate pieces of the metal housing 110. Second, circuit boards or other metal elements within the electrical device 100 can have cuts or slits to reduce the size of metal regions. Third, the electrical device 110 can include a coil core for the power receiving coil that extends along the power receiving coil toward the exterior of the electrical device 110. This can enable the coil core to extend further toward the surface that is placed on the wireless charger, thus decreasing the effective distance between the coil core and the charger. Fourth, the electrical device 100 can use a metal plate 170 rather than a permanent magnet as an alignment feature to align with a wireless charger. In some implementations, the metal plate 170 can be a laminated plate, such as one having electrically insulated metal strips, which can reduced eddy currents and power transfer loss in the metal plate 170. Fifth, the electrical device 100 can include one or more layers of shielding to further reduce inefficiency in power transfer. Sixth, the dimensions and structure of the electrical device 100 can be arranged to place the power receiving coil and an associated coil core close to the exterior surface of the electrical device 100, thus allowing the power receiving coil and coil core to be near the power transfer coil of the charger. An electrical device can be made to enable efficient wireless charging by including any or all of these features, including any subcombination of the features.

In general, wireless charging can be used to transmit power to electric devices without any wired connection. A power source, e.g., a charger, can transmit energy in the form of varying magnetic fields to a receiving coil of the electrical device 100. Wireless charging is attractive for a wide range of applications, especially for low-power electrical devices such as smart watches, mobile phones, and portable devices. For low-power electrical devices, wireless charging improves the user experience and can provide better durability, e.g., better water-proofing and dust-proofing due to the ability to avoid charging ports allowing ingress of dust and water. In some cases, various brands or models of electrical devices can all be charged by a same wireless charger.

Wireless charging of low-power electrical devices typically involves inductive coupling between a power receiving coil in the device to be charged and a power transmitting coil in the wireless charger. The power transmitting coil of the charger delivers magnetic flux to the power receiving coil of the electrical device. Power transfer happens varying magnetic fields from the power transmitter induce voltage and current in the receiving coil of the electrical device. In many cases, the power receiving coil is disposed on or near a receiving coil core, which is configured to enhance the inductive coupling and potentially limit the impact of nearby metallic objects on the charging process. For example, the receiving coil core can help direct magnetic flux to the receiving coil. The output of the receiving coil can be rectified and used to charge the electrical device's battery. The electrical device can communicate with a charger to specify desired charging levels and to stop charging when the battery is charged to capacity.

There are various wireless charging standards to specify interoperable wireless power transfer and data communication between the charger and the electrical device. One example is the Qi wireless standard. The devices and chargers discussed in this document can be configured to comply with the Qi standard or interoperate with devices that do.

Wireless charging efficiency depends on a number of factors, including how far apart the electrical device is from the wireless charger and how well the receiving coil and the transmitting coil are aligned with each other. One way to quantify the efficiency is with a coupling factor, which can indicate how much of the magnetic flux transmitted from a transmitting coil reaches the receiving coil. A high coupling factor indicates efficient energy transfer and a tightly coupled electrical device and the charger, while a low coupling factor indicates the coupling is loose with low energy transfer efficiency.

In some devices, a magnet is included to help align the receiving coil of the device with a transmitting coil of the charger. For example, the receiving coil and transmitting coil can each have a permanent magnet at the center. The magnets have opposite magnetic poles facing each other to cause attraction of the device toward the proper alignment for charging and to hold the device in place on the charger. However, a permanent magnet in the electrical device provides a static magnetic field that may saturate the coil core of a receiving coil and reduce efficiency. For example, a permanent magnet can provide a static magnetic field that saturates a ferrite coil core and reduces the ability of the coil core to respond to changing magnetic fields from the transmitting coil, and thus reduces the resulting efficiency of the reception by the receiving coil. As a result, an alternative material or design is preferable to allow for attraction and alignment of the electrical device to the charger, while also allowing higher charging efficiency. As discussed further below, this may be achieved using metal, such as steel, for the alignment feature in the device to be charged instead of using a permanent magnet. In addition, efficiency can be further enhanced by providing the metal alignment feature with small, separate metal segments, such as strips of steel to form a laminated steel element. In the presence of a magnet in a charger, the laminated steel element can provide a force of attraction that is similar or equivalent to the force of attraction for an integral steel element or even another magnet. The laminated steel element also provides greater efficiency, because the small steel segments develop much smaller eddy currents than an integral steel element would.

Metal exteriors can provide a premium appearance for devices and improved product durability. However, metals can cause inductive heating and reduce wireless charging efficiency. During wireless charging, magnetic flux generates eddy currents in metal that can lead to additional heating in the electrical device and consume the energy intended for wireless charging. One technique that can reduce induced currents in a metal housing an improve efficiency is to form the metal housing of separate metal segments, e.g., electrically isolated segments, that present smaller regions of continuous metal. For example, the metal housing 110 can have slits 130 cut to separate the metal housing 110 into multiple sections. Limiting the size of metal elements can also limit the size of eddy currents developed in response to wireless charging energy. As shown in FIG. 1, the metal housing 110 may still extend around a majority of or substantially all of the electrical device 100, but may do so with separate metal segments.

Referring still to FIG. 1, the electrical device 100 can represent a user device such as a watch. Other components of the watch, such as a watch face (e.g., a display screen), a watch band, a top-side housing, etc. are not shown in FIG. 1. Although various examples in this document describe a watch, the techniques for improving wireless charging efficiency in devices with a metal housing 100 can be use with other devices, such as phones, tablet computers, laptop computers, wearable devices, and other devices.

In the example of FIG. 1, the metal housing 110 provides an exterior for at least a portion of the electronic device 100. The metal housing 110 is configured to receive and contain the internal components of the electrical device 100, such as the electrical assembly 120.

The metal housing 110 has a window defined through it, shown as center window 140. This window 140 can be filled with a non-metallic material, such as glass, plastic, ceramic, etc. to allow magnetic flux to reach the power receiving coil through the window 140. In some implementations, the window 140 is translucent, transparent, or substantially transparent to facilitate the operation of sensors (e.g., that may send and/or receive light or other signals through the window 140, such as PPG sensors).

In FIG. 1, the metal housing 110 has a substantially round perimeter. The exterior surface of the metal housing 110 is curved and convex, with the largest outer diameter curving inward toward the center window 140 at the bottom of the housing 110. The metal housing 110 can have a non-metallic material fixed to the center to provide the center window 140. The metal housing 110, the center window 140, and their connections to other components of the electrical device 100 can be fitted to be water-proof and dust-proof. The metal housing 110 may be fabricated into any appropriate shape such as round, square, oval, rectangular, etc., including much more complex shapes. In some other implementations, the metal housing 110 may be in a rectangular shape, or other shapes.

The electrical assembly 120 includes various electrical components of the electrical device 100. For example, the electrical assembly 120 includes a power receiving coil, sensors, and one or more printed circuit board (PCB). The electrical assembly 120 is located in the metal housing 110 and is protected by the metal housing 110. Details of the electrical assembly 120 will be shown in later figures.

Figure 2C:
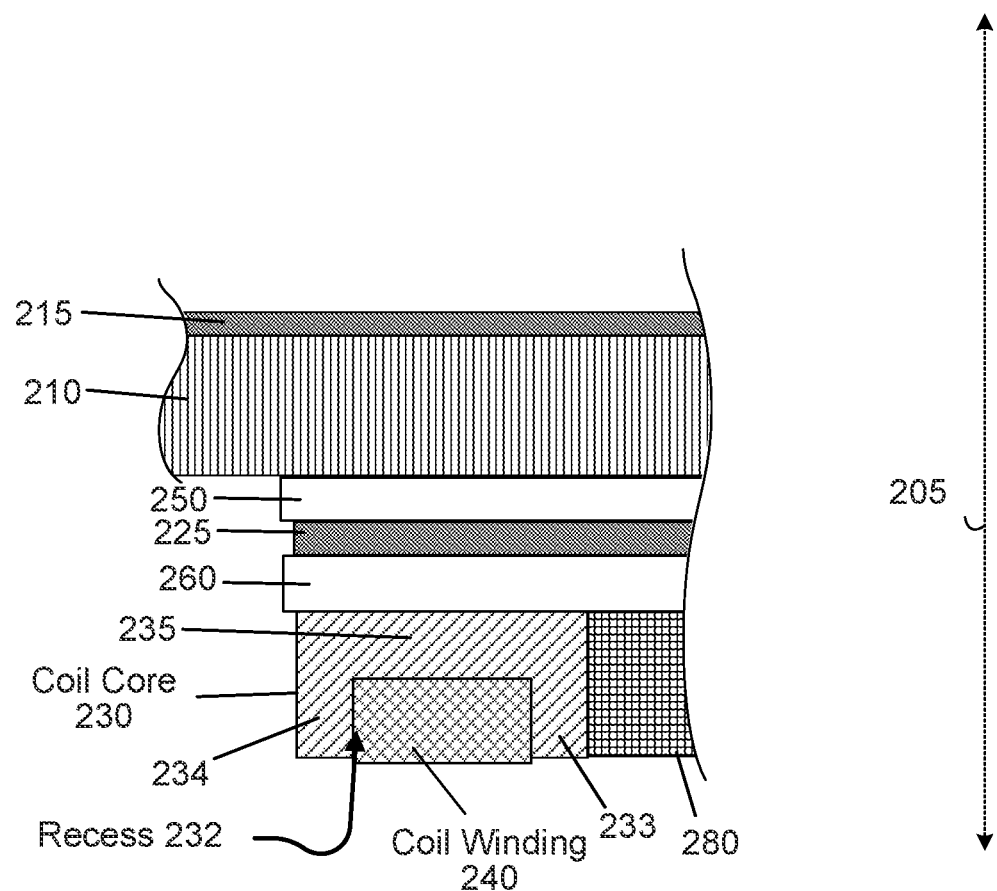
FIG. 2C shows a cross-sectional view of a coil core and a coil winding of the electrical assembly.

FIG. 2A is a bottom view of the electrical assembly 120 of the electrical device 100. FIG. 2B is a side view of the electrical assembly 120 of the electrical device 100. FIG. 2C shows a cross-sectional view of a coil core 230 and a coil winding 240 of the electrical assembly 120.

The electrical assembly 120 includes a power receiving coil that includes a coil winding 240 and an associated coil core 230. The coil core 230 and the coil winding 240 operate as a power receiving unit to inductively couple with the power transmitting coil of a wireless charger and receive power transmitted through varying magnetic fields. The current developed in the coil winding 240 can be provided to a rectifier and other electronics of the electrical device 100 to generate power to charge a battery of the electrical device 100 and to operate the electrical device 100.

The coil core 230 may be made of ferrite or nanocrystalline magnetic materials. The coil core 230 can direct and confine magnetic flux from the power transmitting coil to the region where the coil winding 240 is located, to enhance coupling of the coil winding 240 with the power transmitting coil of a charger. The ferrite can increase the effective inductance of the coil winding 240 and in turn enhance mutual inductance between the receiving unit and a charger. Furthermore, the ferrite coil core 230 can help magnetically shield the coil winding 240 from nearby metallic objects in the electrical device 100.

In the example of FIGS. 2A-2C, the coil core 230 has a generally annular shape as shown in the bottom view of the electrical device 100 in FIG. 2A. The coil core 230 defines an annular recess or opening to receive at least a portion of the coil core 230. This recess 232 is shown in the cross-section of FIG. 2C. The coil core 230 can have a substantially U-shaped cross-section. For example, the coil core 230 can have an annular inner wall 233 and an annular outer wall 234 that both extend downward, e.g., from a top wall 235 along axis 205, toward the bottom surface of the electrical device 100. The side walls 233, 234 can extend along a majority of the height of the coil winding 240 along the axis 205, or along all or substantially all of the height of the coil winding 240 along the axis 205. In some implementations, the bottom surface of the side walls 233, 234 of the coil core 230 may extend to or beyond a bottom surface of the coil winding 240.

The coil core 230, and thus the coil winding 240, can be sized and positioned to be located at the region of the window 140 (see FIG. 1), which provides the core 230 and winding 240 at a metal-free region of the exterior of the electrical device 100. The annular outer wall 234 can extend to or nearly to the outer perimeter of the window 140 to maximize the size of the coil core 230 and coil winding 240 given the size of the window 140. The side walls 233, 234 of the coil core 230 and the coil winding 240 can also extend downward along axis 205 to the window 140, so that the core 230 and winding 240 are as close to the charger as possible during wireless charging.

The electrical assembly 120 includes various layers and components. From top to bottom, as shown in FIGS. 2B and 2C, the electrical assembly includes a ground plane 215, a PCB 210, electromagnetic shielding 250, a second ground plane 225, additional electromagnetic shielding 260, the coil core 230, and the coil winding 240. As shown in FIGS. 2A and 2C, one or more sensors 280 and a wireless charging alignment feature, such as a metal plate 170 or a magnet, can be located in an opening defined by the inner surface of the annular inner wall 233 of the coil core 230.

As illustrated in FIGS. 2B and 2C, the coil winding 240 is disposed in or on the coil core 230, and the coil core 230 is disposed on a magnetic shielding layer 250. The magnetic shielding layer 250 is configured to reduce or block magnetic flux. The magnetic shielding layer 260 is also configured to reduce or block magnetic flux. In some implementations, the PCB shielding layers 250 and 260 are formed of ferrite. In some other implementations, the PCB shielding layers 250 and 260 are formed of nanocrystalline materials, which may provide a higher amount of shielding than ferrite for a given thickness. The shielding layers 560, 260 and the ground plane 225 can be printed circuit board layers. The ground plane 225 located between the shielding layers 250, 260 can be a ground plane for the one or more sensors 280. The ground plane 225 can be one layer of a flex printed circuit board (PCB) for the one or more sensors. The flex PCB may have multiple layers, such as 4 layers, with top and bottom layers for signal routing and the center two layers for PCB ground plans. Here, only a ground plane 225 is shown for clarity in illustration, but the ground plane 225 shown may represent a multilayer circuit board with multiple ground planes and/or other layers.

The one or more sensors can include one or more photoplethysmography (PPG) sensors and the ground plane 225 can be a PPG ground plane used by these sensors. In a watch, the PPG sensors can face toward a user's skin and perform physiological measurements through the window 140. For example, a PPG sensor may include light emitting diodes and a receiver, at least some of which may be arranged in cross-shaped profile, to detect a user's pulse.

In some implementations, the PCB 210 is a multiplayer PCB that permits high component density in the electrical device 100. The PCB 210 includes a ground plane 215. Various electronics, such as a processor, memory, voltage regulators, a rectifier, a battery, a battery charging circuit, a display screen, a camera, a microphone, user input devices, and so on can be coupled to the PCB 210, including potentially on layers above the ground plane 215. As shown in FIG. 2A, the ground plane 215 can include slits 290 that break up the ground plane and reduce the size of contiguous metal regions present. The slits 290 can separate the ground plane into several separate regions, to disrupt the formation of eddy currents in the ground plane 215 due to the application of wireless power. This can reduce eddy currents to smaller loops on each isolated ground plane regions, to reduce the induction, with resulting heating and power transfer loss, due to eddy currents flowing in the ground plane 215. The ground plane 225 may similarly have slits or be otherwise be formed with separate regions to reduce eddy current formation.

The electrical device 100 also includes a metal plate 170 or other wireless charging alignment feature configured to cooperate with a magnet in a wireless charger to position and/or hold the electrical device 100 in the correct position for wireless charging. The metal plate 170 may be located at or near the center of the electrical assembly 120 and/or the electrical device 100, such as in within an opening defined by the annular inner wall 233 of the coil core 230. The metal plate 170 may be designed with any appropriate shape, such as round, oval, and square.

Generally, the metal plate 170 is configured to align the receiving coil winding 240 of the electrical device 100 to a transmitting coil of a charger, by a magnetic force generated between the metal plate 170 and a magnet (e.g., a permanent magnet or electromagnet) of the charger. For example, the magnetic attraction can align the electrical device 100 laterally along the plane of the surface of the wireless charger. The generated magnetic force can also help attract the electrical device 100 to the charger and reduce an air gap between the bottom of the electrical device 110 and a top surface of the charger. In some implementations, the diameter of the metal plate 170 is between 2 mm and 6 mm, or between 3 mm and 5 mm, or approximately 4 mm. In some implementations, the thickness of the metal plate 170 is between 0.25 mm and 3 mm, or between 0.5 mm and 2 mm, or approximately 1 mm. In some implementations, the metal plate 170 is formed as a laminated metal plate with a dielectric material between metal strips or segments to provide electrical insulation. More details regarding the laminated metal plate are presented in FIGS. 5 and 6.

Figure 3A:
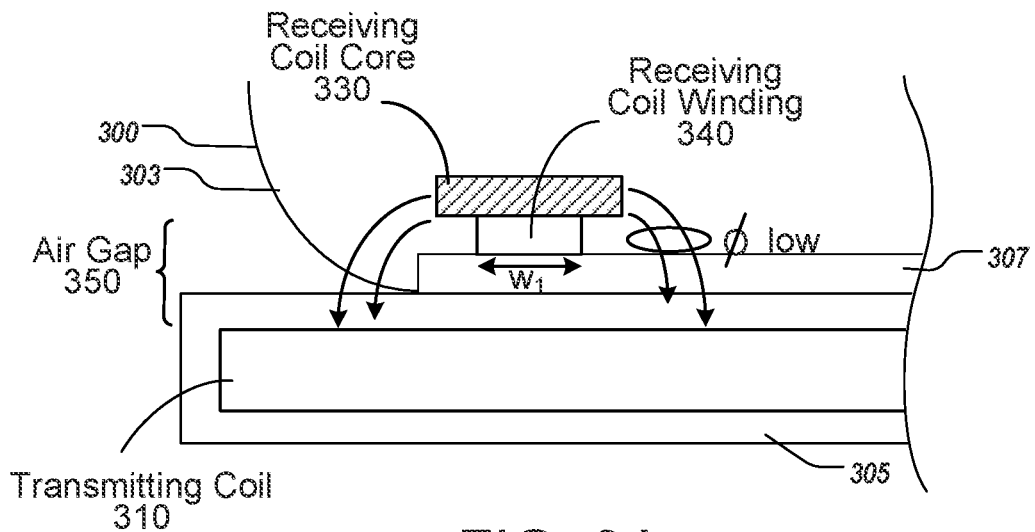
FIG. 3A is a cross-sectional view of portions of a device and a wireless charger.

FIG. 3A is a cross-sectional view of portions of a device 300 and a wireless charger 305. The device 300 includes a receiving coil core 330 and a receiving coil winding 340. At the exterior of the device 300 there is a metal housing 303 and a non-metallic window 307. The receiving coil winding 340, as shown in FIG. 2A, has a rectangular cross-section and, unlike the coil core 230 of FIG. 2A-2C, does not extend downward along the sides of the coil winding 340. The receiving coil winding 340 has a width of Wi. The material of the window 307 and the upper surface of the charger 305 provides a gap 350 between the receiving coil core 330 and the transmitting coil 310.

Figure 3B:
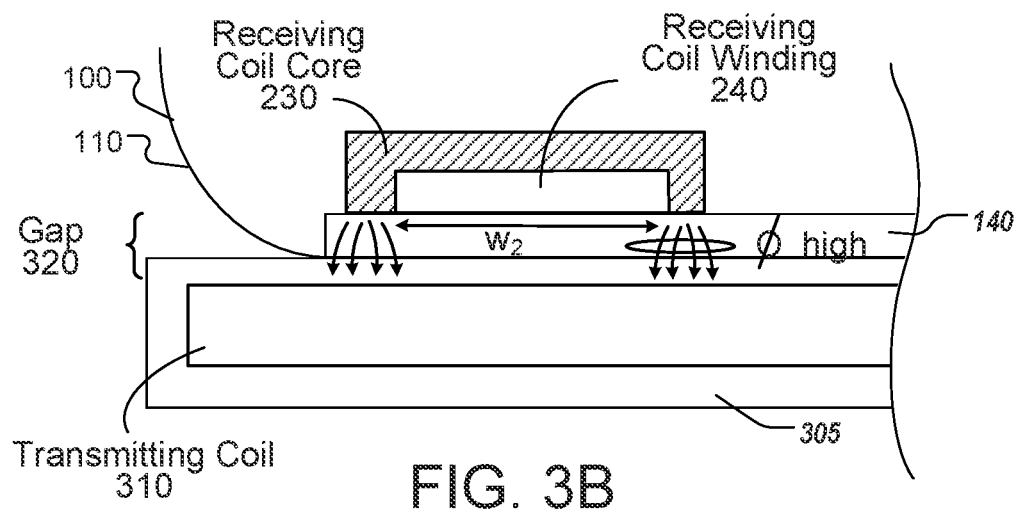
FIG. 3B is a cross-sectional view of portions of the electrical device of FIG. 1 and a wireless charger.

FIG. 3B is a cross-sectional view of portions of the electrical device 100 of FIG. 1 and a wireless charger 305. The electrical device 100 has several differences from the device 300 that provide higher wireless power transfer efficiency. As shown in FIGS. 2A-2C, the receiving coil winding 240 is at least partially disposed in the recess (e.g., a groove or channel) of the receiving coil core 230. The receiving coil core 230 has a width, $w_2$, that is wider than the receiving coil core 330 of FIG. 3A. This can enable the receiving coil 230 to receive larger amounts of magnetic flux and provide better inductive coupling and higher reception efficiency than the coil 340.

In FIG. 3B, inner and outer walls of the receiving coil core 230 are extended toward the bottom side of the device 100, so that the bottom surface of the coil core 230 is closer to the transmitting coil 310 of the charger 305. In this example, the bottom surface of the coil core 230 extends to the bottom surface of the receiving coil winding 240. The gap 320 between the receiving coil 240 and the transmitting coil 310 is shorter than the gap 350 of FIG. 3A. These changes allow the coil core 230 of the electrical device 100 to better direct and localize the transmitted magnetic fields from the transmitting coil 310, allowing a greater amount of the magnetic flux to be received by the receiving coil 240 compared to the receiving coil 340 of FIG. 3A. The reduced gap 320, resulting from the extended ends of the U-shaped coil core 230, leads to an increased magnetic field density at the receiving coil 240 and improved charging efficiency.

Figure 4B:
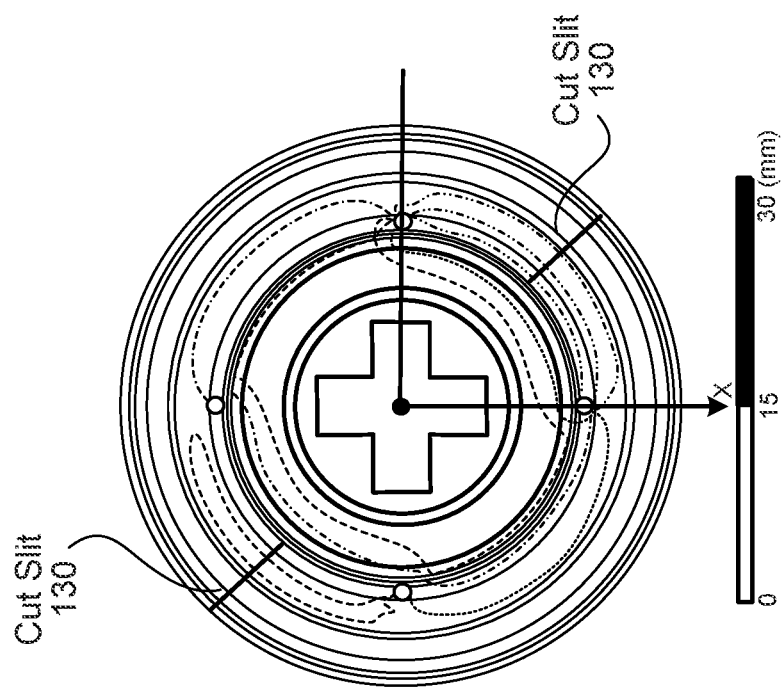
FIG. 4B is a diagram that illustrates an example of simulated eddy current loops on the metal housing of the electrical device.
Figure 4A:
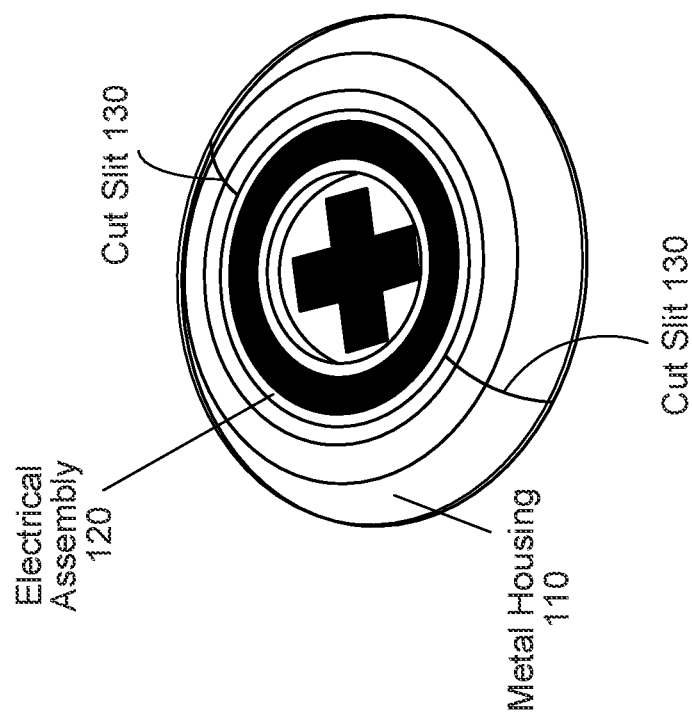
FIG. 4A is a perspective view of the electrical device of FIG. 1.

FIG. 4A is a perspective view of the electrical device 100 of FIG. 1. The view shows two slits 130 cut through the metal of the metal housing 110. The slits 130 extend through the metal to separate the metal into separate sections. It is generally desirable to be able to charge the device 100 using a charger that has a transmitting coil larger than the receiving coil 240 of the electrical device 100. For example, it may be desirable to charge a watch with a general-purpose charger that has coils meant for phones, tablet computers, or other devices. As a result the transmitting coil will often be larger than the window 140 and the coil core 230 and receiving coil 240. At least a portion of the transmitted magnetic field passes through the metal housing 110 and can induce currents in the metal housing 110. For example, eddy currents can flow in closed loops in planes perpendicular to the magnetic field and cause heating. By including the slits 130, or by otherwise breaking up the metal of the metal housing 120 into two or more separate sections, the amount of contiguous metal surface in the presence of the transmitted magnetic field is reduced and the resulting heating and current generation is reduced as well.

As shown in FIG. 4A, two slits 130 are introduced to break the metal housing 110 radially through the metal housing ring. Where large eddy currents would have been possible in an unbroken ring, the current loops that occur in the smaller, separate metal housing segments are smaller. In some implementations, the slits 130 may have a width (e.g., a distance of separation between two adjacent sections) of 3 mm or less. In some implementations, the slits 130 each have a width that is 1 mm or less. The gaps between the metal housing segments that the slits 130 provide may be filled in by electrically insulating materials. In some implementations, multiple metal segments may be combined to form a substantially continuous metal housing 110, e.g., a housing that extends around an entire perimeter of the device 100 except in the regions of the slits 130.

FIG. 4B is a diagram that illustrates an example of simulated eddy current loops on the metal housing of the electrical device. The simulation results reveals local current loops in the metal housing segments. For example, as shown in FIG. 4B, the eddy current loops are isolated in high current density paths that are separated by the slits 130 at 11 o'clock and 5 o'clock of the metal housing 110. The slits 130 provide greater coupling efficiency and thus higher charging efficiency than would be achieved with an integral metal housing. For example, simply adding two slits 130 to separate the metal housing 110 into two metal sections can improve the coupling coefficient (e.g., coupling efficiency) by 5% or more. Additional slits 130 may be provided in some implementations, to break the metal of the housing 110 into a larger number of sections. The metal housing 110 and the electrical assembly 120 are isolated by a layer of dielectric materials, for example, a layer of diamond-like carbon. The different metal sections of the housing 110 can be electrically insulated from each other. The metal sections of the housing 110

Figure 5:
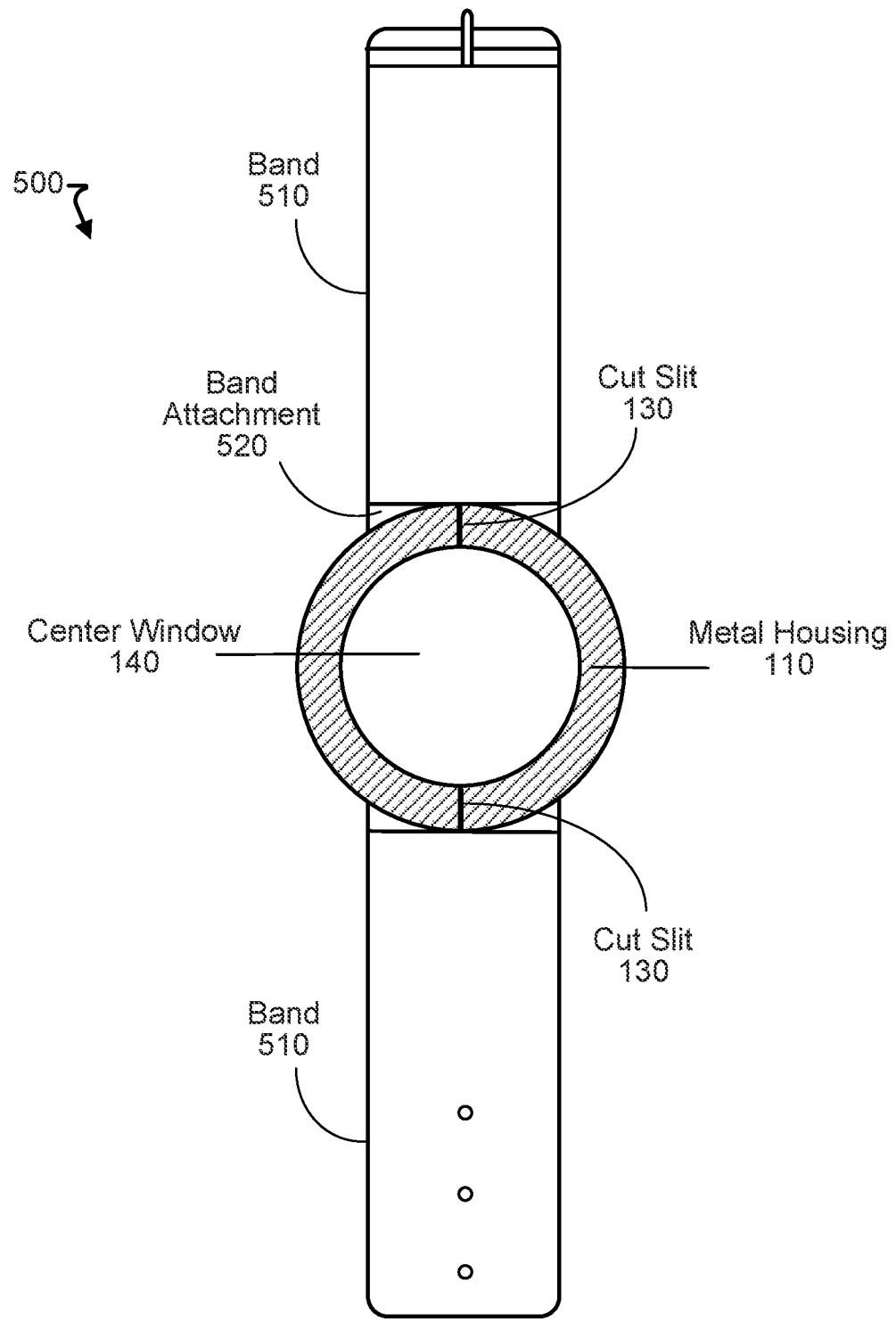
FIG. 5 is a backside view of a watch that has a metal housing and is configured for wireless charging.

FIG. 5 is a diagram that illustrates an example of a backside view of the device 100 configures as a watch 500 with slits 130 on the metal housing 110. In this example, two slits 130 are aligned along a length direction of the watch band 510. As shown in FIG. 5, the band attachments 520 connect the watch band 510 to the metal housing 110. The slits located close to the center of the band attachments 420 on the metal housing 110. As a result, forces that pull on the two portions of the watchband will pull on both metal segments of the metal housing 110, without pulling the metal segments away from each other. In other words, forces on the watch band are transmitted to both metal segments in a direction that is along the two integral metal elements rather than pulling the two metal segments in opposing directions from each other (e.g. in a direction that would tend to separate the two pieces of the metal housing 110). As discussed earlier, the slits 130 extend entirely through the metal of the metal housing 110.

The electrical device 100, as shown in FIG. 2A, includes an alignment feature, such as a metal plate 170. The metal plate 170 is disposed at the center of the coil core 230 and on the PPG ground plane 225. The metal plate 170 is configured to help attract and align the electrical device 100 on a charger, through a magnetic force between the metal plate and a permanent magnet in the charger.

Figures 6A, 6B:
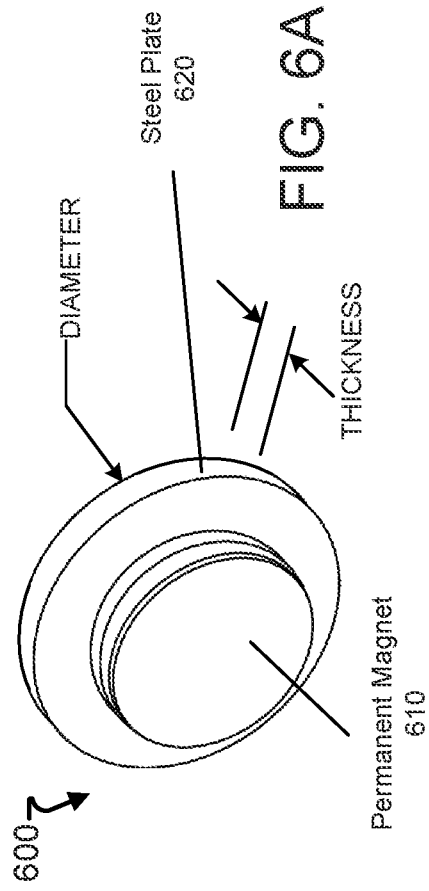
FIG. 6A is a perspective view of an example of a steel plate and permanent magnet.
FIG. 6B is a table that indicates attraction strengths of various configurations of steel plates with respect to a permanent magnet, expressed as percentages of force compared to the attraction between two permanent magnets.

FIG. 6A is a diagram that illustrates an example of a Steel—Permanent Magnet model 600 for magnetic force simulation. This model 600 includes a Permanent Magnet 610 and a steel plate 620. The steel plate 620 and the permanent magnet 610 are attracted to each other by the magnetic force, with an interface layer that represents the interface, e.g., an air gap, in the wireless charging. The dimensions of the steel plate 620 are the key parameters to achieve a comparable magnetic force in the model 600 compare to a Permanent Magnet—Permanent Magnet model. In the model 600, the diameter of the permanent magnet 610 is 0.5 inch and the thickness of the permanent magnet 610 is 0.125 inch. In this illustration, the dimensions of the steel plate 620 are varied to simulate the magnetic forces as functions of dimensions of the steel plate 620. The reference magnetic force comes from the Permanent Magnet—Permanent Magnet model wherein the permanent magnets are in same size as permanent magnet 610. In this simulation, the diameter of the steel plate 620 is changing from 0.5 inch up to 1 inch, and the thickness of the steel plate 620 is varied from 0.012 inch to 0.194 inch.

FIG. 6B is a diagram that illustrates a simulation result of the Steel—Permanent Magnet model 600 compared to the Permanent Magnet—Permanent Magnet model. FIG. 6B reveals that, with a fixed steel plate thickness, e.g. 0.06 inch, the magnetic force of model 600 increases as the diameter of the steel plate 620 increases. Similarly, with a fixed steel plate diameter, e.g., 0.6 inch, the magnetic force of the model 600 increases as the thickness of the steel plate 620 increases. The trends observed in the simulation results recommend a steel plate with diameter equal to or up to 20% more than that of the diameter of the permanent magnet 610, and a thickness roughly same as the thickness of the permanent magnet 610, in order to achieve a comparable magnetic force compare to the Permanent Magnet—Permanent Magnet model.

Figure 7:
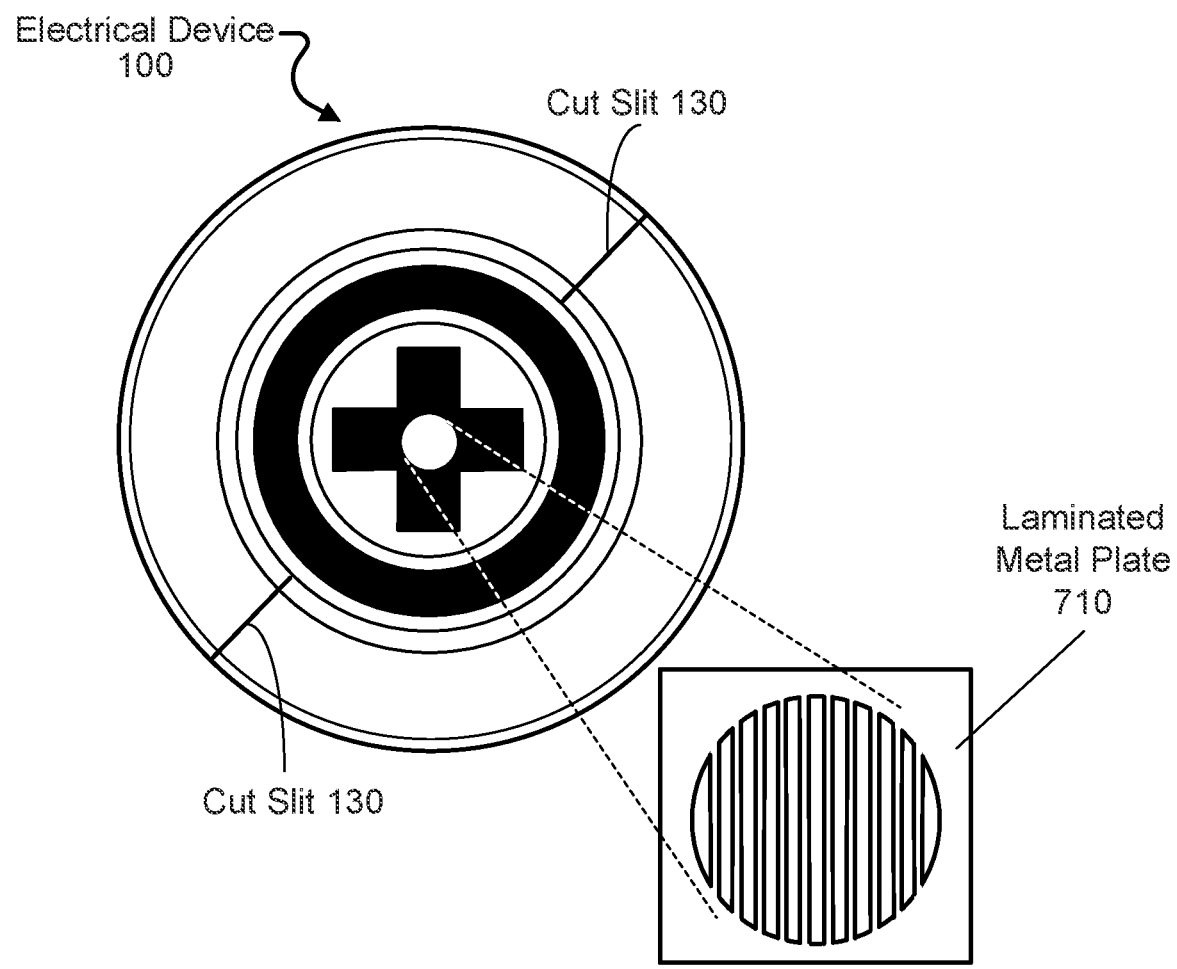
FIG. 7 is a diagram that illustrates an example of a laminate metal plate used in the electrical device of FIG. 1.

FIG. 7 is a diagram that illustrates an example of a laminated metal plate 710 in the electrical device 100. As discussed earlier, a metal plate 170 in the electrical device 100 is configured to align the electrical device 100 to a charger through the magnetic force the metal plate 170 and a permanent magnet in the charger. The electromagnetic field passes through the metal plate and generates eddy current loops along the surface of the metal plate 170. The eddy current loops will cause induction heating and consume the wireless charging energy.

In this illustration, the metal plate 170 is broken into a plurality of metal strips to reduce the induction heating and loss when in the presence of a varying magnetic field. As shown in FIG. 7, a laminated steel plate 710 can be used in the electrical device 100 and can be located at the center of the receiving coil windings 240. The laminated steel plate 710 includes a plurality of steel strips or layers, and the steel strips are connected by electrically insulating material in between. The plurality of steel strips and the insulating material form the laminate steel plate 710. The laminated steel plate 710 allows for an attractive force to a magnet of the charger that is near to or equivalent to the amount of magnetic force that would occur using a solid steel disc, but with significantly lower loss and heating. In this example, the gaps between the neighboring metal strips may small, for example, in a range from 1 mm to 1 um.

In the laminated metal plate 710, the small metal strips provide a much higher impedance compared with that of a solid steel disc. This lowers eddy currents and contributes to a reduction of the induction heating during the wireless charging. In this illustration, the laminated metal plate 710 maintains a same size and shape as those of the metal plate 170, and thus leads to a same magnetic force between the laminated metal plate 710 and the permanent magnet of the charger.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in electronic circuitry, or in computer software, firmware, and/or hardware, including the structures disclosed in this specification and their structural equivalents, or in combinations of one or more of them. A circuit board can be implemented as a mixed-signal chip (e.g., a CMOS integrated circuit) that includes analog, digital, and mixed-signal circuits, as well as potentially firmware or embedded software. For example, operations of the control circuitry may be implemented using digital circuitry, an FPGA (field programmable gate array) or other programmable logic device, a processor and corresponding software, and so on.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A device comprising:
a wireless power receiving coil and an associated coil core, wherein the coil core is formed of a magnetic material and defines:
(i) a center opening that extends through the coil core;
(ii) an inner wall that surrounds the center opening and that is located inside the wireless power receiving coil;
(iii) an outer wall that surrounds the inner wall and the center opening; and
(iv) a recess that is located between the inner wall and the outer wall, and that surrounds the center opening, at least a portion of the wireless power receiving coil being disposed in the recess; and
a housing comprising one or more metal portions, wherein the housing is configured to receive at least a portion of the wireless power receiving coil and the associated coil core in a housing opening defined by the one or more metal portions.

2. The device of claim 1, wherein the coil core has a substantially U-shaped cross-section.

3. The device of claim 2, wherein the coil core has the U-shaped cross-section along at least a curved portion of the coil core;
wherein the recess is a curved channel defined along the curved portion; and
wherein the power receiving coil is at least partially disposed in the curved channel.

4. The device of claim 1, wherein the coil core is at least partially formed of ferrite.

5. The device of claim 1, wherein the metal of the housing extends around a majority of the wireless power receiving coil and the associated coil core.

6. The device of claim 1, wherein the metal of the housing extends around a majority of an outer perimeter of the wireless power receiving coil and the associated coil core.

7. The device of claim 1, wherein the metal of the housing extends around substantially an entire outer perimeter of the wireless power receiving coil and the associated coil core.

8. The device of claim 1, wherein the wireless power receiving coil has a substantially circular inner side and a substantially circular outer side, and the coil core extends (i) along a top side of the wireless power receiving coil, (ii) along the inner side of the wireless power receiving coil, and (iii) along the outer side of the wireless power receiving coil.

9. The device of claim 1, wherein the wireless power receiving coil has a top side and a bottom side opposite the top side, wherein the bottom side is configured to face toward a wireless charger when the device is in position to receive power from the wireless charger;
wherein the wireless power receiving coil has a height from the top side to the bottom side, and wherein the coil core extends along a majority of the height of the wireless power receiving coil.

10. The device of claim 1, wherein:
the inner wall of the coil core extends along an inner perimeter of the wireless power receiving coil; and
the outer wall of the coil core extends along an outer perimeter of the wireless power receiving coil.

11. The device of claim 1, comprising an alignment feature configured to interact with a magnet of a wireless charger to align the device with the wireless charger, wherein the alignment feature comprises a plurality of metal elements that are electrically insulated from each other, wherein the alignment feature is located at a center of the wireless power receiving coil, in the center opening that extends through the coil core, and the alignment feature is formed of steel strips that are electrically insulated from each other.

12. The device of claim 1, wherein:
the housing comprises a plurality of metal portions;
the housing opening is defined by the plurality of metal portions; and
the plurality of metal portions are electrically insulated from each other.

13. The device of claim 12, wherein the device is a watch that includes a first watch band segment coupled to the housing and a second watch band segment coupled to the housing;
   wherein the housing has a first metal portion of the plurality of metal portions extending from the first watch band segment to the second watch band segment; and
   wherein the housing has a second metal portion of the plurality of metal portions extending from the first watch band segment to the second watch band segment.

14. The device of claim 1, comprising a circuit board that has a ground plane, has a substantially circular outer perimeter, and defines at least two slits that extend radially and separate the ground plane into separate segments.

15. A device comprising:
   a wireless power receiving coil and an associated coil core, wherein the coil core defines a center opening that extends through the coil core, the wireless power receiving coil surrounding the center opening in the coil core;
   a housing comprising one or more metal portions, wherein the housing is configured to receive at least a portion of the wireless power receiving coil and the associated coil core in an opening defined by the one or more metal portions; and
   an alignment feature that is located at a center of the wireless power receiving coil, in the center opening that extends through the coil core, the alignment feature configured to interact with a magnet of a wireless charger to align the device with the wireless charger, wherein the alignment feature comprises a plurality of magnetic metal elements that are electrically insulated from each other.

16. The device of claim 15, wherein the alignment feature is formed of steel strips that are electrically insulated from each other.

17. The device of claim 15, wherein the alignment feature is a disc formed of laminated steel.

18. A electronic watch device comprising:
   a display screen;
   a wireless power receiving coil and an associated coil core, wherein the coil core defines a center opening that extends through the coil core, the wireless power receiving coil surrounding the center opening in the coil core;
   a sensor located in the center opening of the coil core;
   a center window configured to permit external light to reach the sensor located in the coil core; and
   a housing that retains the display screen and receives at least a portion of the wireless power receiving coil and the associated core, the housing comprising a plurality of metal portions that form part of an underside of the watch device that is opposite the display screen and that is configured to contact user skin when the electronic watch device is user worn, the plurality of metal portions including a first semi-circular metal portion and a second semi-circular metal portion that are electrically isolated from each other and that at least partially surround the center window.

19. The device of claim 18, wherein the plurality of metal portions are placed at an exterior of the device and extend around substantially an outer perimeter of the device except for gaps between the metal portions, each of the gaps being 3 mm or less.

20. The device of claim 18, wherein the electronic watch device includes a first watch band segment coupled to the housing and a second watch band segment coupled to the housing;
   wherein the first metal portion extends from the first watch band segment to the second watch band segment; and
   wherein the second metal portion extends from the first watch band segment to the second watch band segment.

21. The device of claim 18, wherein the wireless power receiving coil and the associated coil core are part of an electronic assembly that is removable from the housing.

22. The device of claim 18, comprising a circuit board having a ground plane, wherein the ground plane is divided into a plurality of separate sections.

23. The device of claim 18, wherein the housing has a substantially circular outer perimeter and defines at least two slits that extend radially between the first semi-circular metal portion of the housing and the second semi-circular metal portion of the housing.

24. The device of claim 23, wherein the device comprises a circuit board having a ground plane, wherein the circuit board has a substantially circular outer perimeter and defines at least two slits that extend radially and separate the ground plane into separate segments.

25. The device of claim 1, wherein:
   the inner wall comprises an annular inner wall that surrounds the center opening;
   the outer wall comprises an annular outer wall that surrounds the annular inner wall and the center opening; and
   the recess comprises an annular channel that is defined by the coil core, is located between the annular inner wall and the annular outer wall, and surrounds the center opening that extends through the coil core.

* * * * *